A. F. MASURY AND A. H. LEIPERT.
CUSHIONED CONNECTION FOR VEHICLE CONSTRUCTION.
APPLICATION FILED JAN. 19, 1921.

1,400,563. Patented Dec. 20, 1921.
2 SHEETS—SHEET 1.

INVENTORS
Alfred F. Masury and
August H. Leipert
BY
Redding & Greeley
their ATTORNEYS

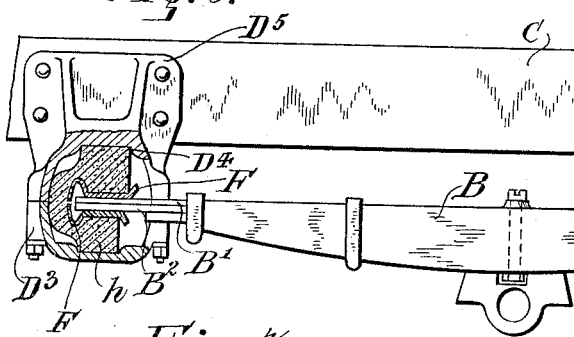
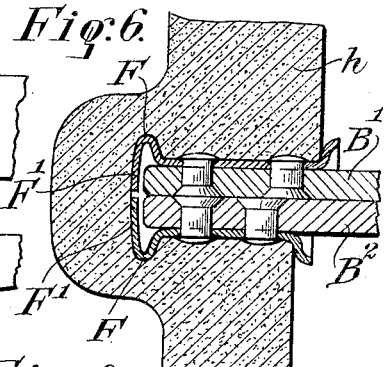
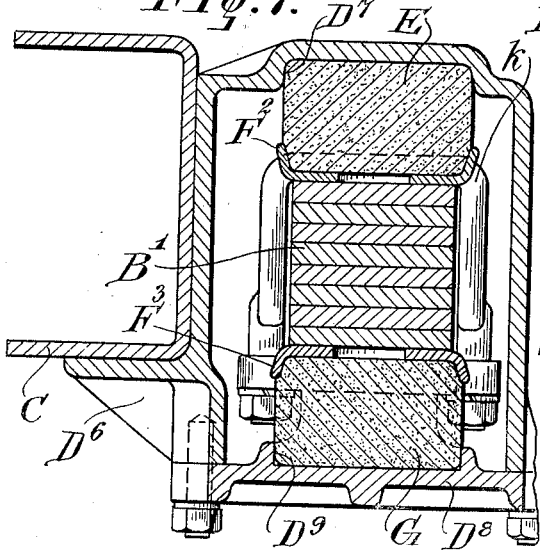
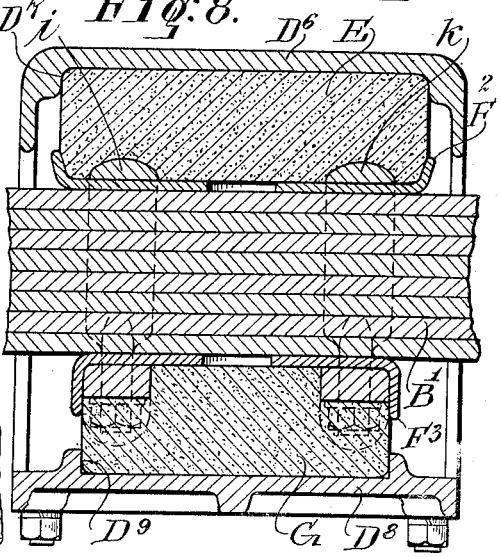
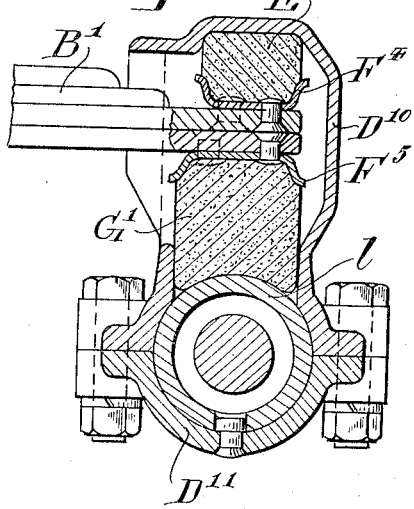
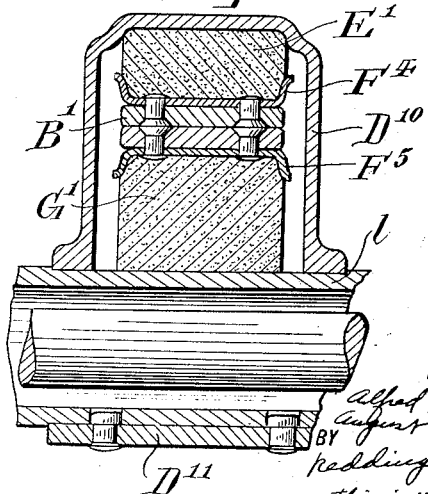

UNITED STATES PATENT OFFICE.

ALFRED F. MASURY AND AUGUST H. LEIPERT, OF NEW YORK, N. Y.

CUSHIONED CONNECTION FOR VEHICLE CONSTRUCTION.

1,400,563.  Specification of Letters Patent.  Patented Dec. 20, 1921.

Application filed January 19, 1921. Serial No. 438,269.

*To all whom it may concern:*

Be it known that we, ALFRED F. MASURY and AUGUST H. LEIPERT, citizens of the United States, residing, respectively, in the borough of Manhattan and in the borough of Queens of the city of New York, in the State of New York, have invented certain new and useful Improvements in Cushioned Connections for Vehicle Construction, of which the following is a specification, reference being had to the accompanying drawings, forming a part hereof.

This invention relates to improvements in cushioned connections for vehicle construction of the type, shown, described and claimed in a copending application filed by the present applicants on May 27, 1920, Ser. No. 384,605. The problems surrounding the spring suspension of a metallic chassis for a motor vehicle are very different from any preceding the development of this art by reason of the heavy loads carried on parts of minimum unsprung weight, and the high speed of travel of the vehicle over roads of varying contour. These conditions have required engineers to make special provision for the connections employed and cushion not only the road shocks but also the great vibrations constantly impressed on the metal throughout. The best practise heretofore has been to interpose between the springs and frame swiveled shackles in order that the vibrations and shocks might be absorbed or compensated for to the greatest possible degree. But these shackles being in constant motion suffer great stresses and wear and make lubrication of vital importance. In any construction where metal to metal is employed adequate lubrication is difficult and in motor vehicle practice nearly impossible so that wear and noise are inevitable results. By the improvements the springs are not connected directly to the frames and the springs are not even connected positively thereto as through an intermediate link, such as a metal shackle. There is, however, interposed between the spring and the frame a yielding connection of a positive character but of non-metallic structure which is connected to the springs and is connected to the frame in such manner as to connect the two without necessitating the contact of metal to metal at any point. The improved connecting element is made up as a rubber or fabricated block which is of sufficient mechanical strength to support the weight of the vehicle on the springs, to connect the two yieldingly but with sufficient stiffness for the transmission of the driving torque and, with the coöperation of the improved associated elements, to resist effectively the side sway. More particularly, the improvements herein have to do with the character of the elements by which the improved connections are secured to the springs and secured to the frame members. These connections may be made in a variety of ways and differ somewhat in different types of spring suspension, as for semi-elliptical and cantaliver suspension. In all constructions, however, provision is made for spring elongation.

Reference is now to be had to the accompanying drawings for a detailed description of different embodiments of the improvements illustrated. In the drawings—

Fig. 5 is a fragmentary view in side elevation showing a spring and vehicle frame connected by an improved block of somewhat modified form.

Fig. 6 is a detail view in section of the block shown in Fig. 5.

Figs. 7 and 8 are detail views in section through improved blocks connected to a cantaliver spring and forming the fulcrum therefor on the vehicle frame.

Figs. 9 and 10 are detail views in section showing the connection between the end of a cantaliver spring and the axle of a vehicle.

Figure 1:
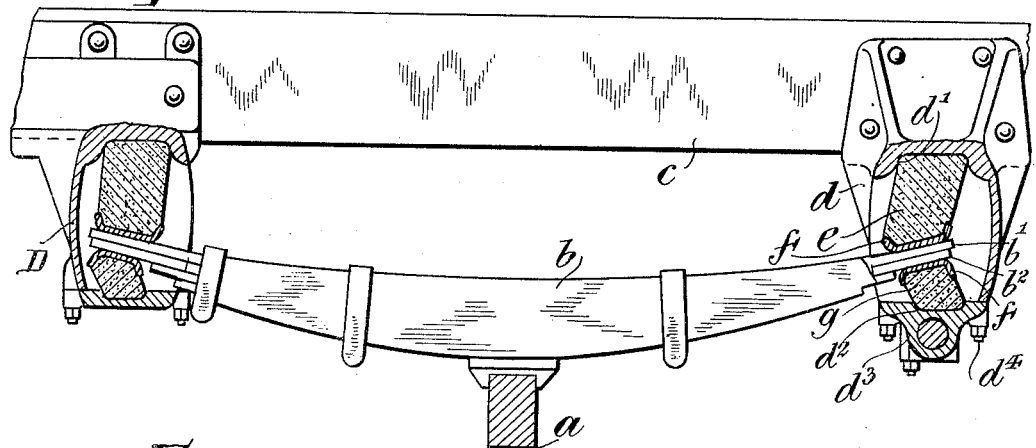
Figure 1 is a view in vertical section of the improved connecting blocks, the spring and frame of the vehicle with which they are associated being indicated conventionally.
Figure 2:
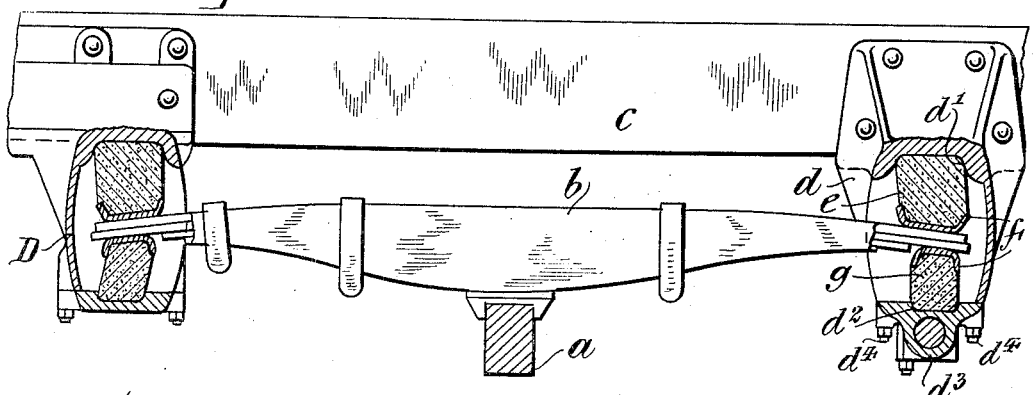
Fig. 2 is a view of the elements illustrated in Fig. 1, but showing the vehicle under load.
Figure 3:
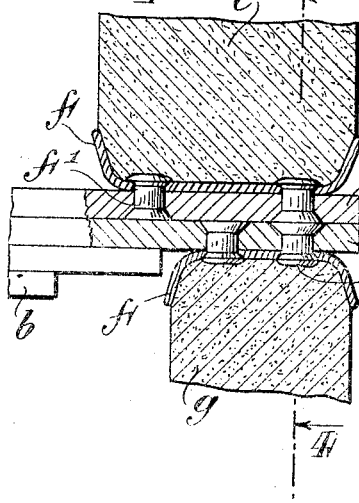
Figs. 3 and 4 are detail views in section through the blocks and spring leaves shown in Figs. 1 and 2.
Figure 4:
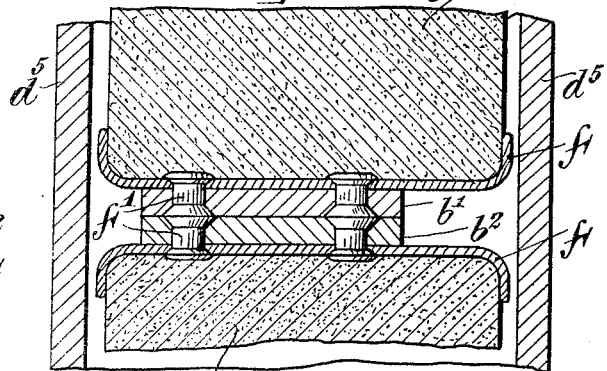

The axle of a motor vehicle is indicated conventionally at *a*, a spring on the axle at *b* and a side frame member to which the spring is to be connected, at *c*. The road shocks and vibrations on the spring *b* and the frame *c* make it impracticable in the motor vehicle art to connect the spring inflexibly to the side frame member and it is believed that any connection therebetween which involves the use of metal either in the form of bolts or shackles is open to objection. In the improved construction the connection is positive in a sense but is yielding and is nonmetallic, so that there is no metal to metal at any point and there are no through mechanical links. In the preferred form of construction a housing $d$ is bolted to the frame $c$ and this housing is open at its lower side and in the side nearest to the spring. In the top wall of the housing is preferably formed a channel $d'$ or other type of seat to receive a nonmetallic block, such as $e$, which is preferably of rubber or fabricated material. Adjacent the free end of the spring $b$ which may terminate in one or more leaves, such as $b'$, $b^2$, are secured channel pieces $f$ of metal, as by means of rivets $f'$. In one of these channel pieces $f$ rests the block $e$, this channel being complementary in a sense to the channel $d'$ for the purpose of retaining the block $e$ in proper relation to both the housing $d$ and the spring $b$. The other channel piece $f$ which may be secured to the underside of one of the spring leaves, such as $b^2$, is complementary in a sense to a channel or other seat $d^2$ formed in the closing cap $d^3$ for the housing $d$. This closing cap may be secured to the lower side of the housing $d$ as by means of bolts $d^4$. In the channel $d^2$ is seated a block $g$ similar generally to the block $e$, and this block $g$ is maintained in proper relation to the end of the spring $b$ by means of the under channel piece $f$ thereon. The end of the spring extends through the open side of the housing $d$. The other end of the spring $b$ extends into a similar housing $D$ which has elements corresponding to the elements heretofore described and which need not be further described. The relation of parts is such as to facilitate the manufacture and assembling and provide for ample spring elongation without disturbing any of the parts. For instance, Fig. 1 indicates a vehicle unloaded while Fig. 2 indicates a possible relation which the parts may assume when the vehicle is loaded. The yielding blocks $e$, $g$, etc., conform sufficiently to load stresses and to spring elongation while retaining all of the elements in proper relation and connecting the spring to the frame with sufficient rigidity for transmission of torque effort. As shown particularly in Fig. 4 the side walls $d^5$ of the housing $d$ have the blocks $e$, $g$ spaced therefrom somewhat but these blocks are limited in their lateral movements by the side walls so that side sway will be limited yieldingly. There is no metal in contact with metal at any point in the positive connection between the spring and the frame. The yielding blocks are to all intents and purposes connected positively to the springs and at some remote point and by independent means connected positively to the frame.

In assembling the embodiment thus far described the bottom caps of the housings $d$, $D$ when removed permit the upper block $e$ to be placed in the groove $d'$ and the end of the spring $b$ with the upper channel piece $f$ to be brought into engagement with the lower end of the block. The lower block $g$ may then be moved up on to its seat $f$ and the cap $d^3$ of the housing bolted into place with the groove $d^2$ affording a confining seat for the lower block $g$. When the cap $d^3$ is applied both blocks $e$ and $g$ are confined under compression.

The construction shown in Figs. 5 and 6 instead of having independent blocks placed above and below the ends of the springs a single block $h$ is employed which is recessed at one side adjacent its midsection to receive the end of the spring B. In this case the spring leaves $B'$, $B^2$ may have riveted thereto similar channel pieces F which afford seats for the upper and lower sections of the block $h$ and protect the material of the block against undue wear upon elongation of the spring. The inner ends of the channel pieces F are turned inwardly, as at $F'$, so as to hold the material of the block out of contact with the ends of the spring. In assembling this embodiment the block $h$ may be first applied to the seats F therefor by moving it laterally into proper relation thereto. The block is then moved on to the channeled seat $D^4$ formed in the housing $D^5$ therefor and the cap $D^3$ is bolted in place, confining the block under compression.

Figs. 7–10 show adaptations of the invention with a cantaliver spring suspension. In Figs. 7 and 8, for instance, there are shown longitudinal and transverse sectional views of blocks and a cantaliver spring $B'$ at the fulcrum point. The frame C of the vehicle has secured thereto a housing $D^6$ in which are carried an upper block E and a lower block G. These blocks are seated on channel pieces $F^2$, $F^3$, respectively, which may be secured in place on the spring leaves by ordinary clips $i$, $k$. The housing $D^6$ is provided in its upper wall with a channel $D^7$ in which the upper block E is seated while the cap $D^8$ for the housing is provided with a channeled seat $D^9$ for the lower block G.

Figs. 9 and 10 are longitudinal and transverse sectional views of the rear end of the cantaliver spring $B'$. The axle tube $l$ has bolted thereon a housing $D^{10}$ and a complementary semicylindrical clamping piece $D^{11}$ therefor. The rear ends of the leaves of the spring $B'$ have riveted thereto channel pieces $F^4$, $F^5$ on which are seated upper and lower blocks $E'$, $G'$ respectively. The upper block $E'$ rests on the upper wall of the housing $D^{10}$ and is held in place therein on a suitable seat, while the lower block $G'$ is confined by the walls of the housing and may rest directly on the axle tube $l$.

As pointed out hereinbefore the improved blocks provided in accordance with the present invention are mechanical connections as such and constitute cushioned shackles connecting the springs and frame of motor vehicles. They transmit the driving stresses and absorb some of the road shock and the more minute vibrations which are constantly impressed on the metal of the motor vehicle by the motor and shafting. The structures shown herein are practical means for carrying out the broader objects of the invention. The advantageous results may be realized in modified structures falling within the skill of a mechanic.

We claim as our invention:

1. In combination with two metallic parts of a motor vehicle, a yielding non-metallic connection therebetween, comprising a cushioned non-metallic block, a metallic seat for the block secured fixedly to one of said parts and a second metallic seat independent of the first named seat secured fixedly to the other of said parts, and means independent of one of said parts to hold the block on said seats against displacement.

2. In combination with two metallic parts of a motor vehicle, a yielding non-metallic connection therebetween, comprising a cushioned non-metallic block, a housing for the block secured fixedly to the frame and formed with a seat to receive the block, and a metallic seat independent of said housing secured fixedly to the spring and engaging the block, said seats holding the block against displacement with respect thereto.

3. A wholly non-metallic connection and support between two metallic parts of a motor vehicle, one of which parts is to be connected to and supported by the other of said parts, comprising independent blocks of yielding material engaged along their proximate faces with one of said parts at opposite sides thereof and engaged with the other of said parts at points remote from said engaging faces.

4. In combination with a spring and frame for a motor vehicle, a yielding connection therebetween comprising nonmetallic cushioned elements, metallic seats for said cushioned elements secured to the upper and lower faces of the spring and receiving said cushioned elements, and a housing secured to the frame and provided with seats therein independent of the first named seats to engage said cushioned elements.

5. In combination with a spring and frame of a motor vehicle, a yielding connection therebetween comprising nonmetallic cushioned blocks, metallic seats therefor secured to the upper and lower faces of the spring, a housing secured to the frame and formed therein with a seat for one of said blocks independent of its first named seat, and a detachable cap for said housing formed with a seat for the other of said blocks independent of its first named seat.

This specification signed this 17th day of January, A. D. 1921.

ALFRED F. MASURY.
AUGUST H. LEIPERT.